April 10, 1956  E. R. ANDERSON ET AL  2,741,126
THERMISTOR TEMPERATURE PROFILE RECORDER
Filed Nov. 28, 1952
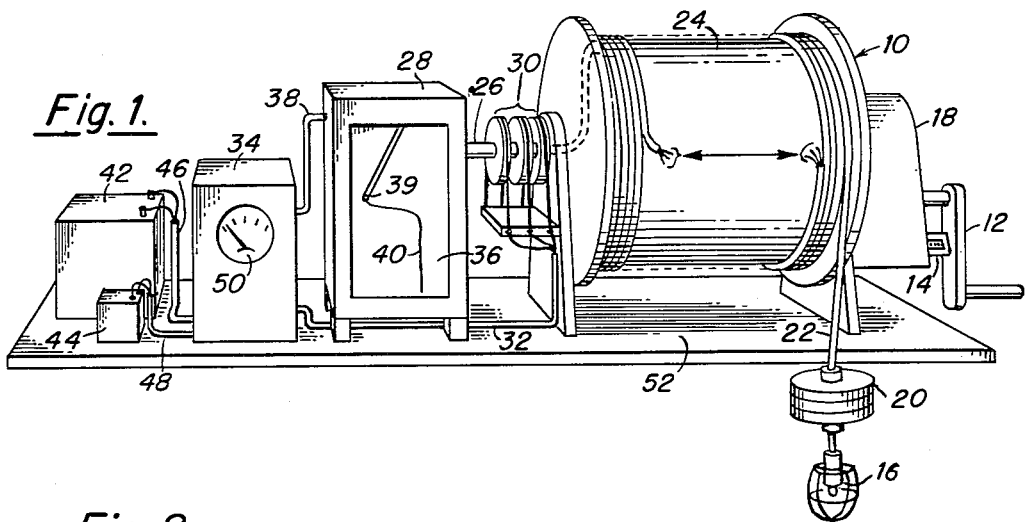
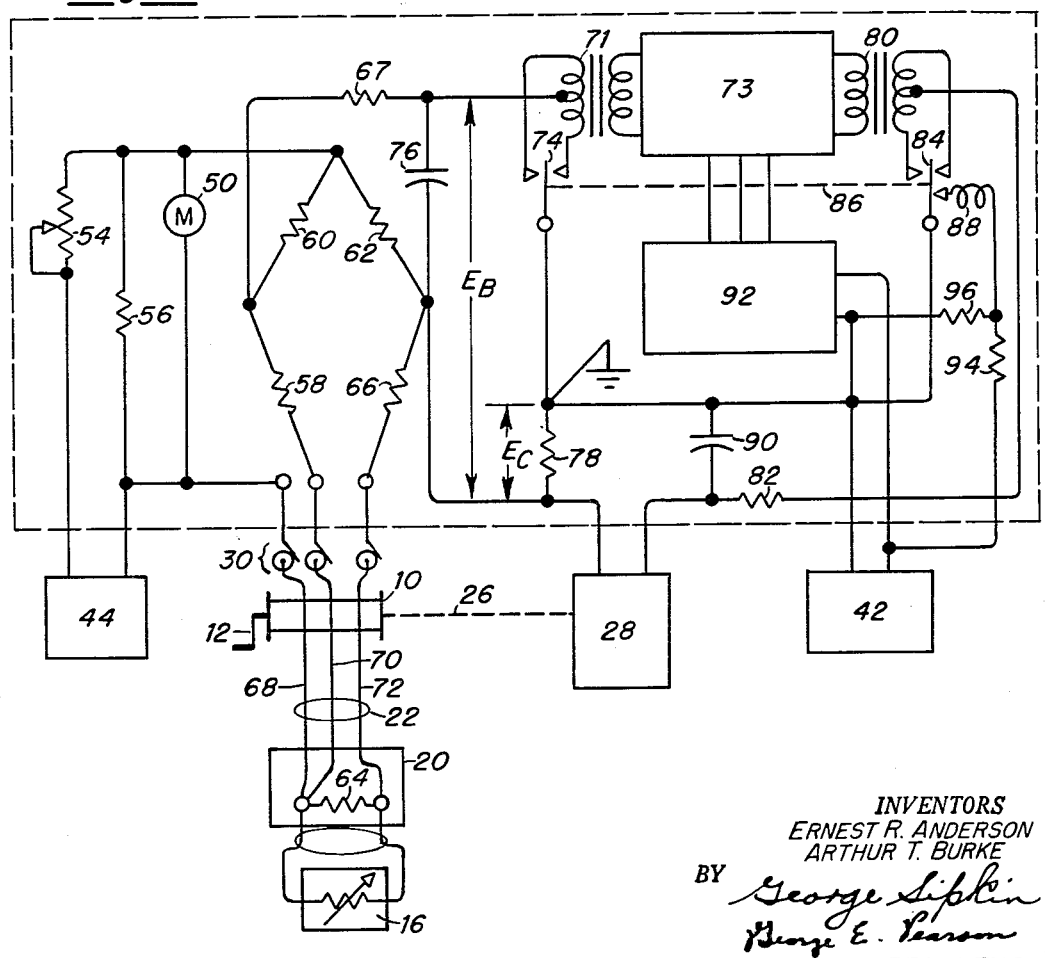
INVENTORS
ERNEST R. ANDERSON
ARTHUR T. BURKE
BY George Lipkin
George E. Pearson
ATTORNEYS United States Patent Office 2,741,126
Patented Apr. 10, 1956

2,741,126

THERMISTOR TEMPERATURE PROFILE RECORDER

Ernest R. Anderson and Arthur T. Burke, San Diego, Calif., assignors to the United States of America as represented by the Secretary of the Navy Application November 28, 1952, Serial No. 323,172

5 Claims. (Cl. 73—344)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for measuring temperatures and more particularly to a sensitive and accurate vertical temperature profile recorder using a thermistor as a temperature-sensing element and especially adapted for measuring and recording the temperature versus depth in relatively protected bodies of water.

A number of different instruments have been utilized for a similar purpose such as the bathythermograph and the deep sea reversing thermometer. However, these devices were not sufficiently accurate or sensitive when used in relatively shallow water and in the case of the deep sea reversing thermometer required a series of separate readings to obtain a profile of the water temperatures.

One preferred embodiment of the present invention consists primarily of a driven cable reel about which a cable is laid with a thermistor type of temperature-sensitive element at the free end. The cable is connected through a slip ring arrangement to an electronic circuit comprising essentially a Wheatstone bridge and an amplifier which provides sufficient current for operating the recording mechanism such as an Esterline-Angus recorder. The cable reel mechanism is connected mechanically to the paper drive of the recorder in such a manner that one turn of the cable reel which pays out a certain unit length of the cable also moves the recorder paper one division.

One object of the present invention is to provide an accurate and sensitive apparatus for recording temperature versus depth in a liquid medium.

Another object of the present invention is to provide an electronic circuit for driving a recording mechanism in response to a small change in the resistance of a temperature-sensitive element.

A still further object of the present invention is to provide an electronic circuit for driving the stylus of a recorder in response to variations in temperature wherein the current through the recorder is proportional to the temperature in any desired range.

Other objects and many of the attendant advantages of this invention will be readily appreciated as the same becomes better undertsood by reference to the following detailed description when considered in connection with the accompanying drawings wherein:

Fig. 1 is a pictorial view illustrating one preferred embodiment of the present invention; and Fig. 2 is a schematic diagram of the electronic portion of the apparatus.

Referring now to the drawings in detail, the general arrangement of the apparatus is shown in Fig. 1 wherein the cable reel mechanism 10 is provided with a hand crank 12 and a revolution counter 14 which may be set to zero when the thermistor 16 touches the water so as to indicate the number of linear units of cable paid out. The housing 18 may, if desired, contain a suitable gear mechanism (not shown) to permit relatively slow lowering of the device into the water and thus provide sufficient time for the thermistor element 16 to respond to the variations in temperature. It will be obvious that the cable reel mechanism could be driven by a suitable constant speed motor, if power is available, and such a motor could, if desired, be connected directly to the gear mechanism within the housing 18.

The element 16 is preferably a thermistor, a commercially available temperature variable sealed resistance unit, or may be any similar waterproof device containing a resistor whose resistance varies with the temperature. The waterproof junction box 20 has one portion connected to the thermistor 16 to permit replacement of damaged thermistor units and has its other portion connected to a three-strand cable 22 which is laid around the drum 24 of the cable reel assembly 10, preferably in a single layer, as shown, to provide the optimum accuracy.

The drum 24 is directly connected by a shaft 26 to the recording mechanism 28, the other end of the three-strand cable 22 being connected by means of a slip ring assembly 30 and a cable 32 to the electronic apparatus within the housing 34. Shaft 26 drives the recording paper 36 on the recorder 28 and the electronic circuit within housing 34 provides an electronic current through a cable 38 to drive the recording pen 39 of the recorder 28 to provide a trace 40 on the paper 36. Batteries 42 and 44 are suitably connected by cables 46 and 48 to the electronic apparatus within the housing 34 which is provided with a meter 50 for a purpose to be described infra. The various units of the apparatus are preferably mounted on a suitable support 52 which may, if desired, be made portable or a permanent mounting depending on the particular application.

A schematic circuit diagram of the electronic portion of the instrument within housing 34 is enclosed within the dashed lines of Fig. 2 which also illustrates the connections to the other portions of the apparatus as illustrated in Fig. 1. The battery 44 supplies power for the Wheatstone bridge through voltage dividers 54 and 56, the voltage across resistor 56 being adjusted to a suitable value by means of the variable resistance 54 and the voltmeter 50.

Three of the legs of the Wheatstone bridge consist of the fixed resistors 58, 60 and 62. The fourth leg consists of the thermistor element 16 in parallel with the fixed resistor 64 and in series with a fixed resistor 66. Resistors 64 and 66 are compensating resistors which provide for a single temperature-resistance curve which will remain the same when other combinations are substituted with different types of thermistors 16. The bridge is arranged with the three wires 68, 70 and 72 of the cable 22 so positioned in the circuit that the balance of the bridge is not substantially disturbed by any variation in the resistance of the wire due to temperature changes as the cable is paid out. This is made possible by arranging each of the wires 70 and 72 in one of the adjacent legs of the bridge so that they are in series with resistors 58 and 66 respectively and the resistance of wire 68 being in the lead to one corner of the bridge does not affect the balance of the bridge circuit. All of the resistors and particularly resistor 64 are preferably made of a material having a constant temperature coefficient of resistance, so that their resistance will be substantially the same at all operating temperatures.

One corner of the bridge is connected through a resistor 67 to the center tap of a transformer 71 for coupling to a conventional A. C. amplifier 73 in conjunction with a synchronous vibrator arm 74. A condenser 76 serves to prevent any A. C. components from passing through the bridge circuit. The other corner of the bridge is connected through resistor 78 to the synchronous vibrator arm 74. The recorder 28 is connected to the center tap of another transformer 80 through a resistor 82 and to the vibrator arm 84 through the resistor 78. The vibrator arms 74 and 84 are coupled as indicated by the dash line 86 and are provided with an operating coil 88. A condenser 90 serves to bypass any A. C. components which may be present in the circuit through the recorder 28.

Battery 42 is suitably connected to a conventional high voltage power supply 92 which is connected to the amplifier 73 in a suitable manner. Battery 42 also supplies voltage to coil 88 through the resistors 94 and 96 constituting a voltage dividing network.

*Operation*

In the operation of the device the thermistor 16 is slowly lowered in the water to any desired depth by means of the hand crank 12 thus driving the paper 36 on the recorder 28. The temperature of the water around the thermistor 16 will vary the resistance of the thermistor thus unbalancing the Wheatstone bridge. A voltage $E_B$ will be developed across the bridge which is a measure of the water temperature. This voltage $E_B$ is compared electronically with the voltage $E_C$ across the resistance 78 and the difference is changed to an alternating current voltage by the synchronous vibrator arm 74 and amplified by the amplifier 73. The amplified voltage is rectified or demodulated by the vibrator arm 84 and again becomes a direct current voltage many times greater than the incoming voltage. This direct voltage causes a relatively large current to be passed through the recorder 28 and the resistor 78 generating the voltage $E_C$. The system is so designed that the voltage $E_C$ tries to become the same as $E_B$ at all times thus working as a servo system.

For any given range, the resistance 78 is so chosen that the voltage developed across resistor 78 by the current required to produce a full-scale reading on the recorder is equal to the voltage $E_B$ appearing across the bridge for the maximum temperature of this range. The recording meter 28 will thus indicate zero for the lowest temperature in the range, full-scale for the maximum temperature of the range, and proportionally between those temperatures on the particular range.

Resistors 64 and 66 are compensating resistors whose values are selected for each particular thermistor so that the resultant temperature-resistance curve is the same as for other combinations which may be substituted at junction box 20. Since each thermistor has its own temperature-resistance curve, adjustment must be made when thermistors are replaced. Therefore, a single temperature-resistance curve is selected as a reference curve, and by selection of the proper values for 64 and 66, the curve of the thermistor being used is adjusted to coincide with the reference curve. The method of selection of proper values for 64 and 66 is fully described in an article "Compensation method for thermistor beads," by L. J. Anderson, on pages 192–193, volume 30, number 5, May 1949, copy of Bulletin of the American Meteorological Society.

The next step is to change the non-linear temperature-resistance relationship curve to one of a linear relationship to make the output voltage $E_B$ across the bridge proportional to the temperature throughout a given range with a particular thermistor. This result is obtained by the selection of the values of resistor 62 in accordance with formula:

$$\frac{R_{T_1}}{R_{T_1}+R_2} - \frac{R_{T_2}}{R_{T_2}+R_2} = \frac{R_{T_2}}{R_{T_2}+R_2} - \frac{R_{T_3}}{R_{T_3}+R_2} \quad (1)$$

Since the values of $R_{T_1}$, $R_{T_2}$ and $R_{T_3}$ may be determined experimentally, this equation may be solved for $R_2$ to obtain the proper value for resistor 62 for a linear relation between the voltage output of the bridge $E_B$ and the temperature.

$R_{T_1}$ is equal to the total resistance of the thermistor 16, wire 72 and resistors 64 and 66 for a temperature at or slightly above the bottom of the range.

$R_{T_2}$ is equal to the total resistance of the thermistor 16, wire 72 and resistors 64 and 66 for a temperature approximately at the mid point of the range.

$R_{T_3}$ is equal to the total resistance of the thermistor 16, wire 72 and resistors 64 and 66 for a temperature at or slightly below the top of the range.

The above formula is derived in the following manner where $E_T$ is the voltage across the thermistor and associated resistances ($R_T$), and $E$ is the voltage applied to the bridge from the battery 44 as indicated by the meter 50.

At temperature $T_1$:

$$E_{T_1} = E \frac{R_{T_1}}{R_{T_1}+R_2} \quad (2)$$

At temperature $T_2$:

$$E_{T_2} = E \frac{R_{T_2}}{R_{T_2}+R_2} \quad (3)$$

At temperature $T_3$:

$$E_{T_3} = E \frac{R_{T_3}}{R_{T_3}+R_2} \quad (4)$$

Since a linear relation is desired between $E_T$ and the temperature, the following expression is controlling:

$$E_{T_1} - E_{T_2} = E_{T_2} - E_{T_3} \text{ where } T_1-T_2=T_2-T_3 \quad (5)$$

Substituting Equations 2, 3 and 4 in Equation 5, the following equation is obtained which obviously results in Equation 1.

$$\frac{ER_{T_1}}{R_{T_1}+R_2} - \frac{ER_{T_2}}{R_{T_2}+R_2} = \frac{ER_{T_2}}{R_{T_2}+R_2} - \frac{ER_{T_3}}{R_{T_3}+R_2} \quad (6)$$

The proper values for resistors 58 and 60 are obtained by utilizing the conditions required for balance at the bottom of the temperature range where the voltage across resistor 58 and wire 70 is equal to the voltage across $R_{T_1}$ or the total resistance of thermistor 16, wire 72 and resistors 64 and 66 for a temperature at the bottom of the range. The values of resistors 58 and 60 are chosen so that their sum is approximately equal to the sum of resistor 62 and the total resistance of the thermistor 16 and resistors 64 and 66, and the ratio of resistor 60 to resistor 58 and wire 70 is exactly equal to the ratio of resistor 62 to $R_{T_1}$.

In some instances where the optimum accuracy is not essential, the recorder 28 may be driven by a motor controlled by a pressure-sensitive element which could be lowered with the thermistor. While this apparatus is primarily intended for use on lakes, bays or other enclosed or semi-enclosed bodies of water where wind-wave swell and surface currents are at a minimum, it may also have application to various problems in physical, chemical and biological limnology and in estuarian oceanography where suitable conditions exist for its operation. Where certain conditions are encountered such as strong current, heavier weights may be utilized to hold the wire substantially vertical or additional means may be provided for measuring wire angles and calibrating for true depth.

Obviously many modifications and variations of the present invention are possible in the light of the above teachings. It is therefore to be understood that within the scope of the appended claims the invention may be practiced otherwise than as specifically described.

We claim:

1. A temperature profile recorder comprising a current recording device having a stylus movable in response to the current supply thereto and means for driving a record paper, a temperature variable resistance unit, means for lowering said unit into a body of liquid, and including means for driving said paper drive in accordance with the depth of immersion of said unit, an electronic circuit, a cable connecting said unit with said circuit, said circuit including a Wheatstone bridge with said unit in one leg thereof, a regulated source of direct current voltage connected to the input junction points of said bridge, a fixed resistance in parallel with said thermistor and another resistance in series with said thermistor across one leg of said bridge, a voltage amplifier, a third resistance, the output of said bridge being operably connected across the input to said amplifier and said third resistance in series, and the amplified output of said amplifier being connected across said recorder and said third resistance in series, whereby the circuit functions as a servo system wherein the voltage across said third resistance is maintained substantially the same as the voltage output from said bridge.

2. A temperature profile recorder comprising a current recording device having a stylus movable in response to the current supply thereto and means for driving a record paper, a temperature variable resistance unit, means for lowering said unit into a body of liquid, and means for driving said paper drive in accordance with the depth of immersion of said unit, an electronic circuit, a three-wire cable connecting said unit with said circuit, said circuit including a Wheatstone bridge with two of said wires included in adjacent legs thereof whereby the balance of said bridge is not substantially affected by the variation in resistance of said wires due to temperature changes, the third one of said wires connecting the junction point of said bridge to a regulated source of direct current voltage, a fixed resistance in parallel with said unit and another resistance in series with said unit across one leg of said bridge, a voltage amplifier, and a third resistance, the output of said bridge being operably connected across the input to said amplifier and said third resistance in series, the amplified output of said amplifier being connected across said recorder and said third resistance in series, whereby the circuit functions as a servo system wherein the voltage across said third resistance is maintained substantially the same as the voltage output from said bridge.

3. A temperature profile recorder comprising a current recording device having a stylus movable in response to the current supply thereto and means for driving a record paper, a temperature variable resistance unit, means for lowering said unit into a body of liquid, and means for driving said paper drive in accordance with the depth of immersion of said unit, an electronic circuit, said circuit including a Wheatstone bridge with said unit in one leg thereof, a regulated source of direct current voltage connected to said bridge, a voltage amplifier, a first resistance, the output of said bridge being operably connected across the input to said amplifier and said resistance in series, the output of said amplifier being connected across said recorder and said third resistance in series whereby the circuit functions as a servo system wherein the voltage across said first resistance is maintained substantially the same as the voltage output from said bridge, and a plurality of resistances in the other legs of said bridge with their numerical values so chosen in conjunction with the numerical value of said unit that the current through said recorder is proportional to the temperature of the liquid surrounding said unit throughout the operative range thereof, said first resistor being selected of such numerical value that the maximum temperature of the desired range will produce a full-scale movement of the stylus on the recorder.

4. A temperature profile recorder comprising a current recording device having a stylus movable in response to the current supply thereto and means for driving a record paper, a temperature variable resistance unit, means for lowering said unit into a body of liquid, and means for driving said paper drive in accordance with the depth of immersion of said unit, an electronic circuit, a three-wire cable connecting said unit with said circuit, said circuit including a Wheatstone bridge with two of said wires included in adjacent legs thereof whereby the balance of said bridge is not substantially affected by the variation in resistance of said wires due to temperature changes, the third one of said wires connecting a junction point of said bridge to a regulated source of direct current voltage, a first compensating resistance in parallel with said unit and a second compensating resistance in series with said unit across one leg of said bridge, a voltage amplifier, and a third resistance, the output of said bridge being operably connected across the input to said amplifier and said third resistance in series, the amplified output of said amplifier being connected across said recorder and said third resistance in series whereby the circuit functions as a servo system wherein the voltage across said third resistor is maintained substantially the same as the voltage output from said bridge, the other resistances in said bridge being so chosen in conjunction with the numerical equivalent value of said unit with its compensating resistances that the current through said recorder is proportional to the temperature of the liquid surrounding said unit throughout the operative range thereof, said third resistor being selected such value that the maximum temperature of the desired range will produce a full-scale movement of the stylus on the recorder.

5. A temperature profile recorder comprising a reel assembly, means for driving said reel assembly, a thermistor unit, a three-wire cable detachably connected to said thermistor unit and wound around said reel for lowering said thermistor unit into a body of liquid, contact means for connecting said cable to an electronic circuit, a current recording device having a stylus movable in response to the current supply thereto and means for driving a record paper operably associated with said reel assembly for driving said paper drive in accordance with the depth of immersion of said themistor unit, an electronic circuit, a three-wire cable connecting said themistor unit with said circuit, said circuit including a Wheatstone bridge with two of said wires included in adjacent legs thereof whereby a balance of said bridge is not substantially affected by the variation in resistance of said wires due to temperature changes, the third one of said wires connecting a junction point of said bridge to a regulated source of direct current voltage, a compensating resistance in parallel with said themistor and another compensating resistance in series with said thermistor across one leg of said bridge, a voltage amplifier, a third resistance, the output of said bridge being operably connected across the input to said amplifier and said third resistance in series, the output of said amplifiier being connected across said recorder and said third resistance in series whereby the circuit functions as a servo system wherein the voltage across said third resistance is maintained substantially the same as the voltage output from said bridge, and a plurality of resistances in the other legs of said bridge circuit so chosen in conjunction with the equivalent numerical value of the thermistor and compensating resistances that the current through said recorder is proportional to the temperature of the liquid surrounding said themistor throughout the operative range thereof, said third resistance being selected of such value that the maximum temperature of the desired range will produce a full-scale movement of said stylus.

References Cited in the file of this patent

UNITED STATES PATENTS

| | | |
|---|---|---|
| 2,191,765 | Lohman | Feb. 27, 1940 |
| 2,242,161 | Athy et al. | May 13, 1941 |
| 2,311,757 | Jackosky | Feb. 23, 1943 |
| 2,414,862 | Fearon | Jan. 28, 1947 |
| 2,574,656 | Peterson | Nov. 13, 1951 |

OTHER REFERENCES

Ser. No. 342,488, Martiensson (A. P. C.), published May 4, 1943.